United States Patent [19]

Sprague

[11] 4,377,506
[45] Mar. 22, 1983

[54] FIRE RETARDANT POLYMER COMPOSITIONS CONTAINING A BORATE-SULFATE MIXTURE

[75] Inventor: Robert W. Sprague, Rancho Palos Verdes, Calif.

[73] Assignee: United States Borax & Chemical Corporation, Los Angeles, Calif.

[21] Appl. No.: 213,979

[22] Filed: Dec. 8, 1980

[51] Int. Cl.$^3$ .............................................. C08K 3/28
[52] U.S. Cl. ..................................... 252/609; 524/405
[58] Field of Search ......................... 252/609; 524/405

[56] References Cited

U.S. PATENT DOCUMENTS

| | | | |
|---|---|---|---|
| 3,385,819 | 5/1968 | Gouinlock | 106/18.12 |
| 3,560,441 | 2/1971 | Schwarcz et al. | 106/18.25 |
| 3,718,615 | 2/1973 | Woods et al. | 524/405 |
| 3,816,307 | 6/1974 | Woods | 252/607 |
| 3,983,040 | 9/1976 | Draganov | 106/18.12 |
| 4,156,654 | 5/1979 | Blasius | 252/607 |
| 4,172,804 | 10/1979 | Christianson et al. | 427/390 D |
| 4,173,666 | 11/1979 | Quinto | 427/427 |

OTHER PUBLICATIONS

Hawley (ed), Condensed Chemical Dictionary, 9th Edition, Van Nostrand Reinhold, NY, 1977, pp. 175 & 749.

*Primary Examiner*—Maurice J. Welsh
*Attorney, Agent, or Firm*—James R. Thornton

[57] ABSTRACT

Polymeric resins containing a fire retardant amount of a borate-sulfate mixture which is predominately boric acid and alkali or alkaline earth metal sulfate. Preferred compositions also contain antimony oxide and/or a halogen source.

16 Claims, No Drawings the reaction of metal borates with concentrated sulfuric acid in a mixing vessel without additional water. The resultant granular product can be used as a feed mixture for preparing boric oxide by heating at elevated temperatures in a furnace. Subsequent patents, such as St. Louis et al. U.S. Pat. Nos. 3,418,244, Sawyer U.S. 3,468,626 and Sprague U.S. 3,468,628, describe modifications of the process for preparing the sodium borate-sulfuric acid reaction product mixture such as by addition by small amounts of water, control of particle size and heating of the mixture. The reaction procedures described by Draganov, Blasius, Christiansen et al. and Quinto, discussed above, may also be employed, if desired.

FIRE RETARDANT POLYMER COMPOSITIONS CONTAINING A BORATE-SULFATE MIXTURE

This invention relates to fire retardant polymer compositions and more particularly relates to organic polymeric resins containing a fire retardant amount of a borate-sulfate composition.

BACKGROUND OF THE INVENTION

Various inorganic borates are known to be useful as fire retardants for materials such as wood, paper, cloth and organic polymers. For example, O'Shawnessy U.S. Pat. No. 3,897,387 describes the use of calcium or magnesium mineral borates as fire retardant agents for organic materials such as plastics, rubber and cellulosic material. Woods U.S. Pat. No. 3,816,307 described the use of Group I metal or ammonium borates having an average particle size of 0.1 and 25 microns as fire retardants for various plastic materials. Gouinlock U.S. Pat. No. 3,385,819 discloses the use of sodium tetraborate in combination with a polyhalogenated cyclopentadiene as a fire retardant for polymeric compositions. Woods et al U.S. Pat. No. 3,718,615 describes the use of a specific hydrated zinc borate as a fire retardant for halogen containing polymers. According to Schwarez et al. U.S. Pat. No. 3,560,441, halogenated polymers can be flame retarded by use of a glass formed by heating antimony trioxide with various inorganic materials including sodium borates. Japanese Patent Disclosure No. 1977-37947 describes preparation of a filler for fire resistant building materials by reacting sulfuric acid with borax in the presence of a porous inorganic refractory aggregate such as perlite. The resultant product is a refractory aggregate impregnated with a mixture of sodium sulfate and boric acid which can be used as a fire resistant filler for incorporating in polyurethane. Other patents such as Draganov U.S. Pat. No. 3,983,040, Blasius U.S. Pat. No. 4,156,654, Christianson et al. U.S. Pat. No. 4,172,804 and Quinto U.S. Pat. No. 4,173,666 describe the reaction of metal borates such as borax or the borate ores with sulfuric acid to form a granular composition for use as a fire retardant for cellulosic materials, especially insulation made from waste newspapers.

DESCRIPTION OF THE INVENTION

The present invention provides fire-retardant polymeric resins containing finely-divided borate-sulfate compositions.

The fire retardants of the present invention can be produced by reacting sulfuric acid with an alkaline earth metal or alkali metal borate. The reaction takes place under either essentially dry conditions or may be in the presence of water to form a slurry or solution of the reaction products which can then be spray-dried or otherwise dried to form a solid, granular product. The borate reactant may be any of the sodium, potassium or calcium borate ores or concentrates such a kernite, howlite, ulexite, tincal, colemanite, RASORITE® sodium borate concentrates, etc. or may be a purified borate such as sodium tetraborate 5- or 10-hydrate or as the anhydrous form.

The ratio of sulfuric acid and borate in the reaction will depend on the particular borate employed, but in general are such as to provide a product which is boric acid and metal sulfate in stoichiometric amounts, although an excess of either the borate or acid may be employed if desired. When sodium tetraborate is the reactant, essentially equimolar amounts of borate and acid are preferred. Various ratios and reaction conditions have been investigated and are described in patents. For example, Canadian Patent No. 811,047 describes the reaction of sulfuric acid with an excess of sodium borate in order to provide a slurry which is then spray-dried to produce a granular product containing sodium sulfate, sodium borate, and other more acidic borate species. Fusby U.S. Pat. No. 3,468,627 describes The resultant borate-sulfate composition is a complex mixture, the exact nature of which will depend on the mole ratio of sulfuric acid to metal borate employed in the reaction and the presence or absence of other materials such as water, etc. Using borax as an example, at equimolar ratios, the product can be considered as primarily a mixture of boric acid and sodium sulfate, although other materials such as sodium bisulfate, polyboratosulfates, unreacted borate, and borates of lower sodium oxide:$B_2O_3$ ratios may be present. When there is a slight excess of sulfuric acid in the reaction mixture, a greater amount of boric acid and bisulfate is present. When the borate is in excess, a greater amount of unreacted borate and other sodium borate salts will be found in the product.

The borate-sulfate compositions applicable to this invention are finely divided, such as obtained by grinding, milling or spray-drying. They generally have a mean particle size of smaller than about 100 microns and, preferably, have a mean particle size of from about 1 to 50 microns.

The borate-sulfate is added to the polymeric resins in an amount corresponding to about 20 to 50 parts of borate-sulfate per 100 parts of resin (phr), preferably about 30 to 40 parts of borate-sulfate per 100 parts of resin.

For optimum fire retardancy, it is preferred that antimony oxide be used in conjunction with the borate-sulfate additive, especially when the polymer contains a halogen source. When antimony oxide is included, much lower amounts of the borate-sulfate may be added. Thus, about 5 to 30 phr of borate-sulfate and about 5 to 30 phr of antimony oxide can be added, with about 8 to 15 phr of each component and a total of about 10 to 40 phr of the combination being preferred. Thus, in such combinations, the weight ratio of antimony oxide to borate-sulfate is about 1:6 to 6:1, preferably about 1:2 to 2:1.

This invention therefore also provides a novel fire-retardant additive for organic polymeric resins which comprises about 8 to 53% boric acid, about 5 to 35% alkali and/or alkaline earth metal sulfate, about 30 to 75% antimony oxide and 0 to about 30% alkali and/or alkaline earth metal borate. Minor amounts of other materials such as alkali metal bisulfates, polyboratosulfates, etc., as described above, may also be present. Such additive mixtures are especially useful for polymeric resins containing a halogen.

The polymeric resins useful in this invention include various thermoplastic and thermosetting organic resins such as the polyesters, polyvinyl chloride, polyolefins (such as polyethylene and polypropylene), polyepoxides, polyurethanes and polystyrene. Such polymers are well known to those skilled in the art of polymer technology. The polymeric resin is preferably halogenated or contains a halogenated additive. Polyvinyl chloride is the presently preferred resin.

Other conventional polymer additives such as plasticizers, dyes, pigments, fillers, stabilizers, antioxidants, antistatic agents, curing agents, accelerators, etc. may also be included in the polymeric resins of this invention without detracting from the advantageous properties of the fire retardant polymers.

The following examples are presented to illustrate typical fire-retardant polymer compositions of this invention, but it is not intended that the invention be limited to the specific examples given since obvious variations will occur to those skilled in the art.

EXAMPLES 1–23

The borate-sulfate was prepared by reaction of sulfuric acid with sodium tetraborate pentahydrate according to the procedure of Fusby U.S. Pat. No. 3,468,627 using a slight molar excess (1%) of sulfuric acid. The resultant product can be considered as essentially a mixture of boric acid and sodium sulfate. It was ground in a ceramic mill, screened through a 100 mesh screen, and then dried at 177° C. for one hour.

Test samples were prepared as castings from PVC plastisols based on the following compositions:

| | phr |
|---|---|
| GEON 121 PVC plastisol resin | 100 |
| di-2-ethylhexyl phthalate | 50 |
| ADMEX-711 epoxidized soybean oil | 5 |
| Ferro 6V6A barium-cadmium-zinc stabilizer | 3 |

Varying quantities of the borate-sulfate and/or antimony oxide were added to the composition as set forth in Table I.

All ingredients were placed in a polyethylene waxed paper cup and stirred with a laboratory stirrer. As the stirring progressed, the mixtures became warmer and more fluid. After all ingredients appeared to be thoroughly mixed (usually on the order of five minutes stirring), the mixture was poured into the space between two ¼" glass plates, separated by a "U" shaped piece of rubber ¼" thick. The glass plates were held together by spring clamps. The whole assembly was placed into a circulating oven, maintained at 177° C., and allowed to cure for 30 minutes. After curing the casting was removed, and cut into test strips approximately ¼"-×¼"×8". The test strips were tested for fire retardancy using the Oxygen Index test, ASTM D-2863-70. In this test, the test strips are placed vertically in the center of a 3 inch diameter glass chimney. The atmosphere in the chimney is controlled by regulating separate nitrogen and oxygen inlet flow rates. The specimen is ignited at the upper end and the nitrogen and oxygen ratio adjusted until combustion is just supported. The minimum concentration of oxygen required to support combustion is reported as a percentage and this figure is defined as the oxygen index.

The following results were obtained in which the Oxygen Index value is the average of two tests.

TABLE I

| Example | Additive (phr) Borate-sulfate | Additive (phr) Antimony oxide | Oxygen Index |
|---|---|---|---|
| 1 | 0 | 0 (control) | 23.2 |
| 2 | 5 | 0 | 22.9 |
| 3 | 5 | 5 | 28.2 |
| 4 | 5 | 10 | 28.8 |
| 5 | 5 | 20 | 28.9 |
| 6 | 10 | 0 | 22.8 |
| 7 | 10 | 5 | 28.4 |
| 8 | 10 | 10 | 29.4 |
| 9 | 10 | 15 | 28.4 |
| 10 | 10 | 20 | 29.0 |
| 11 | 15 | 0 | 23.1 |
| 12 | 15 | 5 | 28.7 |
| 13 | 15 | 10 | 29.3 |
| 14 | 15 | 15 | 29.3 |
| 15 | 20 | 0 | 23.6 |
| 16 | 20 | 5 | 28.7 |
| 17 | 20 | 10 | 29.3 |
| 18 | 20 | 15 | 29.2 |
| 19 | 20 | 20 | 29.7 |
| 20 | 10 | 30 | 28.9 |
| 21 | 30 | 0 | 24.3 |
| 22 | 30 | 10 | 30.1 |
| 23 | 40 | 0 | 24.6 |

EXAMPLES 24–26

An aqueous solution containing boric acid and sodium sulfate was spray-dried to give a composition analyzing 2.5% $Na_2O$, 39.8% $B_2O_3$, 37.3% $Na_2SO_4$ and 20.3% water (by difference). This composition corresponds to 55.4% boric acid, 34% sodium sulfate and 10.6% sodium tetraborate pentahydrate. The mean particle size of the product was 50 microns, with 80 percent between 10 and 70 microns.

The borate-sulfate product was added to Atlac 711-05A, described as a brominated polyester (18% bromine) based on tetrabromo-bis-phenol-A and propylene glycol containing fumaric acid in amounts corresponding to 5 and 10 parts per hundred resin. Methyl ethyl ketone peroxide catalyst (0.5%) and cobalt napthenate promoter (0.9%) were added and a polyester-fiberglass resin sheet was formed (containing 26% glass). The resin was cured at room temperature for about 14 hours and then post-cured at 93° C. for 2 hours. The cured resin was cut into test strips and the Oxygen Index values determined according to the procedure of Examples 1–23. The following results were obtained.

TABLE II

| Example | Borate-sulfate (phr) | Oxygen Index |
|---|---|---|
| 24 | 0 (control) | 30.9 |
| 25 | 5 | 32.4 |
| 26 | 10 | 32.8 |

EXAMPLES 27–29

The procedure of Examples 24–26 was repeated using a non-halogenated polyester resin, Atlac 382-05A, based on bisphenol-A, propylene glycol and fumaric acid. The results are presented in the following Table III.

TABLE III

| Example | Borate-sulfate (phr) | Oxygen Index |
| --- | --- | --- |
| 27 | 0 (control) | 20.4 |
| 28 | 5 | 20.9 |
| 29 | 10 | 22.7 |

Various changes and modifications of the invention can be made, and to the extent that such variations incorporate the spirit of this invention, they are intended to be included within the scope of the appended claims. For example, although the borate-sulfate mixtures used in the compositions of this invention are economically prepared by reaction of sulfuric acid with an alkali metal and/or alkaline earth metal borate, it is obvious that similar mixtures may be prepared by combining previously prepared boric acid with an alkali metal sulfate and/or alkaline earth metal sulfate such as in aqueous solution and then removing the water by evaporation. Although such a preparative procedure would be less desirable from an economic standpoint, the resultant mixture may be used in the fire-retardant compositions of this invention with similar results.

What is claimed is:

1. A fire-retardant additive comprising antimony oxide and a borate-sulfate mixture formed by reaction of sulfuric acid with a borate selected from alkali metal borates, alkaline earth metal borates, and mixtures thereof.

2. An additive according to claim 1 in which the weight ratio of said antimony oxide to said borate-sulfate mixture is about 1:6 to 6:1.

3. An additive according to claim 1 in which the weight ratio of said antimony oxide to said borate-sulfate mixture is about 1:2 to 2:1.

4. An additive according to claim 1 in which said borate-sulfate mixture is essentially a mixture of boric acid and sodium sulfate.

5. A fire-retardant composition comprising an organic synthetic polymer and a fire-retardant amount of a borate-sulfate mixture formed by reaction of sulfuric acid with an alkali metal borate, alkaline earth metal borate, or mixtures thereof.

6. A fire-retardant composition according to claim 5 in which said organic synthetic polymer is polyvinyl chloride.

7. A fire retardant composition according to claim 5 in which said reaction of sulfuric acid is with hydrated sodium tetraborate.

8. A fire-retardant composition according to claim 5 comprising about 30 to 40 parts of said borate-sulfate mixture per hundred parts of said organic synthetic polymer, said parts by weight.

9. A fire-retardant composition according to claim 5 in which antimony oxide is included.

10. The method of fire retarding an organic synthetic polymer which comprises incorporating in said polymer a fire-retardant amount of a borate-sulfate mixture formed by reaction of sulfuric acid with a borate selected from alkali metal borates, alkaline earth metal borates, and mixtures thereof.

11. The method according to claim 10 in which said borate-sulfate mixture is essentially a mixture of boric acid and sodium sulfate.

12. The method according to claim 10 in which antimony oxide is included.

13. The method according to claim 10 in which said polymer is polyvinyl chloride.

14. A fire-retardant additive comprising a mixture of boric acid, alkali and/or alkaline earth metal sulfate and antimony oxide.

15. The additive according to claim 14 in which said alkali metal sulfate is sodium sulfate.

16. The additive according to claim 14 in which said antimony oxide represents about 30 to 75% by weight of said mixture.

* * * * *